United States Patent [19]
Miller et al.

[11] 3,899,497
[45] Aug. 12, 1975

[54] PREPARATION OF 3-QUINUCLIDINYL BENZILATE

[75] Inventors: Jacob I. Miller; Gaston E. Dudley, both of Baltimore, Md.; Philip A. Blackwell, Jr., Cleveland, Miss.; Omer O. Owens, Edgewood, Md.

[73] Assignee: The United States of America as represented by the Secretary of the Army, Washington, D.C.

[22] Filed: Mar. 26, 1962

[21] Appl. No.: 183,337

[52] U.S. Cl............................ 260/293.53; 260/294.3
[51] Int. Cl.² ........................................ C07D 211/00
[58] Field of Search..................... 260/294.3, 293.53

[56] References Cited
UNITED STATES PATENTS
2,843,593   7/1958   Farkas et al. .................... 260/294.3

Primary Examiner—Leland A. Sebastian
Attorney, Agent, or Firm—Nathan Edelberg; Robert P. Gibson; Robert W. Church

[57] ABSTRACT

1. A method for the preparation of 3-quinuclidinyl benzilate which comprises reacting methyl benzilate with 3-quinuclidinol in an inert anhydrous aliphatic hydrocarbon solvent in the presence of 7–15 molar percent of metallic sodium based on the methyl benzilate.

5 Claims, No Drawings

PREPARATION OF 3-QUINACLIDINYL BENZILATE

The invention described herein may be manufactured and used by or for the Government of the United States of America for governmental purposes without the payment to us of any royalty thereon.

This invention relates to a new and improved method of manufacturing the compound 3-quinuclidinyl benzilate.

This compound is also known by the systematic name 3-benziloyloxy-1-azabicyclo [2.2.2]-octane. It is disclosed and claimed in the patent to Sternbach U.S. Pat. No. 2,648,667. The patent to Farkas et al U.S. Pat. No. 2,843,593 discloses an improved process for the preparation of this compound.

The present invention is a further improvement in the production of this compound. We have found that contrary to the teachings of the above Farkas et al. patent only a catalytic amount of metallic sodium is required and that the reaction proceeds smoothly and gives a higher yield of a high purity product when the reactants are reacted in a single stage process rather than the two-stage process of the prior art.

The present invention consists of reacting in an inert anhydrous hydrocarbon solvent one mole equivalent of methyl benzilate with 5–10 mole per cent excess 3-quinuclidinol in the presence of 7 to 15 mole per cent of metallic sodium based on the methyl benzilate. The transesterification reaction occurs as the vigorously stirred reaction mixture is heated slowly to reflux and refluxed for a period of 2.5 to 24 hours.

We have further found that the use of about 5 molar per cent excess of 3-quinuclidinol with 7 – 8 mole per cent metallic sodium (based on the amount of methyl benzilate used) in normal heptane gives the best results for this reaction.

This process has important advantages over the prior art in that it is a single stage reaction and therefore no elaborate equipment is needed. Likewise, the 3-quinuclidinyl benzilate precipitates out of the reaction medium in a high degree of purity. A recrystallization step is thus eliminated and a cold water wash of the precipitate is adequate. In this manner, we have obtained yields of the final product in the range of about 80–95% and at the same time having a purity equal to or greater than 94%.

It is to be understood that other liquid aliphatic hydrocarbon solvents such as pentanes, hexanes, octanes or mixtures thereof may be used in the present process but the yields are not as great.

EXAMPLE 1

Into a 500 ml. round bottom three-neck flask equipped with a modified Dean-Stark water separator, a dropping funnel, a Hershberg stirrer and a thermometer were added, in order, methyl benzilate (19.4 g., 0.08 moles), 3-quinuclidinol (10.7 g., 0.084 moles), sodium dried n-heptane (300 ml.), and small lumps of metallic sodium (0.13 g., 0.0057 g. atoms). All openings to the atmosphere were protected by drying tubes filled with a layer of dehydrated silica gel or "Drierite" (i.e., anhydrous calcium sulfate and a layer of sodium hydroxide pellets. The vigorously stirred reaction mixture was heated to reflux in an oil bath. At about the time the n-heptane -methanol azeotrope started to distill, practically all of the reactants had dissolved. The azeotrope was collected as it distilled. After 15 minutes of reflux time, 1.3 ml. (theory 3.2 ml.) of methanol was collected. After approximately 30 minutes, 2.2 ml. of the methanol was collected and the white solid product began to precipitate. The Dean-Stark separator was then permitted to fill and most of the distillate was allowed to return to the reaction flask. The azeotrope was removed slowly from the Dean-Stark apparatus at a rate of about 0.15 ml. per minute. During the reaction period, the volume of the mixture was kept constant by the addition of n-heptane from the dropping funnel. A total of approximately 50 ml. of distillate was removed. After 4 hours, the reaction was stopped and the mixture was cooled to 20°C. As far as it could be determined, the theoretical quantity of methanol was collected. The white crystalline solid product was collected on a Buchner funnel, washed thoroughly with several 20 ml. portions of water, dried in vacuo over phosphorus pentoxide. The dry product (25.3 gm., 94% yield based on methyl benzilate) melted at 163°–166°C, amine content 100.4%, purity 99%.

Analysis: calculated for $C_{21}H_{23}NO_3$: C, 74.75; H, 6.87; O, 14.25. Found, C, 74.9; H, 7.0; O, 14.01.

In the foregoing manner, the examples shown in Table I were carried out.

TABLE I

| Example | methyl (MB) benzilate g. (moles) | 3-quinuclicinol g. (moles) (% excess) | sodium g. (atoms) (% based on MB) | Reaction time Hrs. | Yield (%) | Purity (%) | amine content | M.P. (°C) |
|---|---|---|---|---|---|---|---|---|
| 2[a] | 9.7 (0.04) | 5.3 (0.042) ( 5) | 0.07 (.003) ( 7.5) | 2.5 | 85 | 94 | 97.2 | 163–165 |
| 3[a] | 19.4 (0.08) | 10.7 (0.084) ( 5) | 0.15 (0.0065) ( 8.1) | 5 | 95 | 95 | 97.8 | 163–166 |
| 4[b] | 9.7 (0.04) | 5.3 (0.042) ( 5) | 0.08 (0.0035) ( 8.7) | 8 | 86.2 | 95 | N/A | 164–166 |
| 5[b] | 9.7 (0.04) | 5.3 (0.042) ( 5) | 0.07 (0.003) ( 7.5) | 20 | 90 | 83 | N/A | 159–163 |
| 6[b] | 9.7 (0.04) | 5.5 (0.044) (10) | 0.07 (0.003) ( 7.5) | 20 | 87 | 89 | N/A | 163–165 |
| 7[b] | 4.8 (0.02) | 2.8 (0.022) (10) | 0.07 (.003) (15.0) | 24 | 73 | 94 | N/A | 163–165 |
| 8 | 4.8 (0.02) | 2.7 (0.021) ( 5) | 0.05 (0.0022) (11) | 16 | 81 | 89 | 100.4 | 161–164 |

[a] Hershberg stirrer
[b] Glass blade stirrer

For the purpose of this invention, we consider any amount of sodium substantially less than an equivalent amount to be a catalytic amount. Therefore, the range from 7–15 per cent sodium is considered by us to be definitely a catalytic amount.

We claim:
1. A method for the preparation of 3-quinuclidinyl benzilate which comprises reacting methyl benzilate with 3-quinuclidinol in an inert anhydrous aliphatic hydrocarbon solvent in the presence of 7–15 molar per cent of metallic sodium based on the methyl benzilate.

2. A method for the preparation of 3-quinuclidinyl benzilate which comprises reacting methyl benzilate with a 5–10 per cent molar excess of 3-quinuclidinol in an inert anhydrous aliphatic hydrocarbon solvent in the presence of 7–15 molar percent of metallic sodium based on the methyl benzilate.

3. A method as set forth in claim 2 in which the hydrocarbon solvent is normal heptane.

4. A method for the preparation of 3-quinuclidinyl benzilate which comprises reacting methyl benzilate with 5 molar per cent excess of 3-quinuclidinol in an anhydrous liquid alkane solvent in the presence of an amount of 7–8 mole per cent of metallic sodium based on the amount of methyl benzilate.

5. A method as set forth in claim 4 in which the alkane solvent is normal heptane.

* * * * *